Aug. 14, 1945.　　　　E. T. NORD　　　　2,381,921
MILLING AND MARKING MACHINE
Filed July 26, 1943　　　　6 Sheets-Sheet 1

INVENTOR:
ERIC T. NORD
BY Saywell & Wesseler
ATTORNEYS

Aug. 14, 1945.　　　　E. T. NORD　　　　2,381,921
MILLING AND MARKING MACHINE
Filed July 26, 1943　　　6 Sheets-Sheet 2
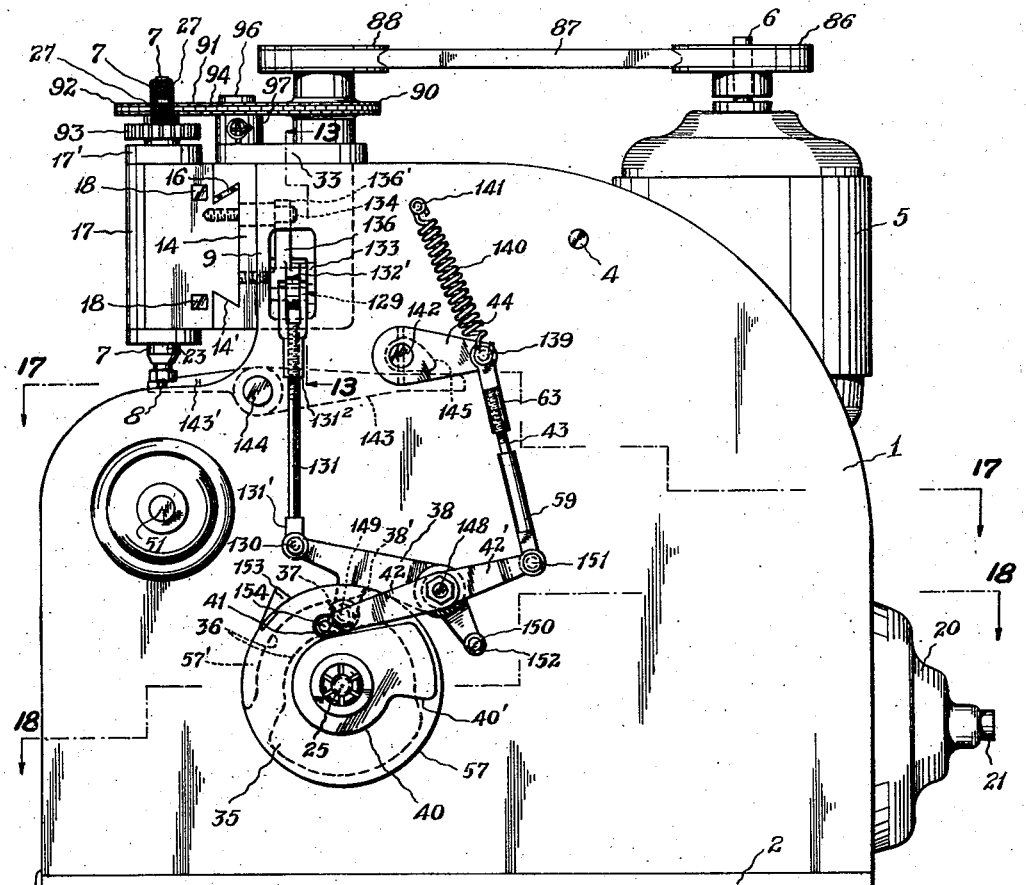
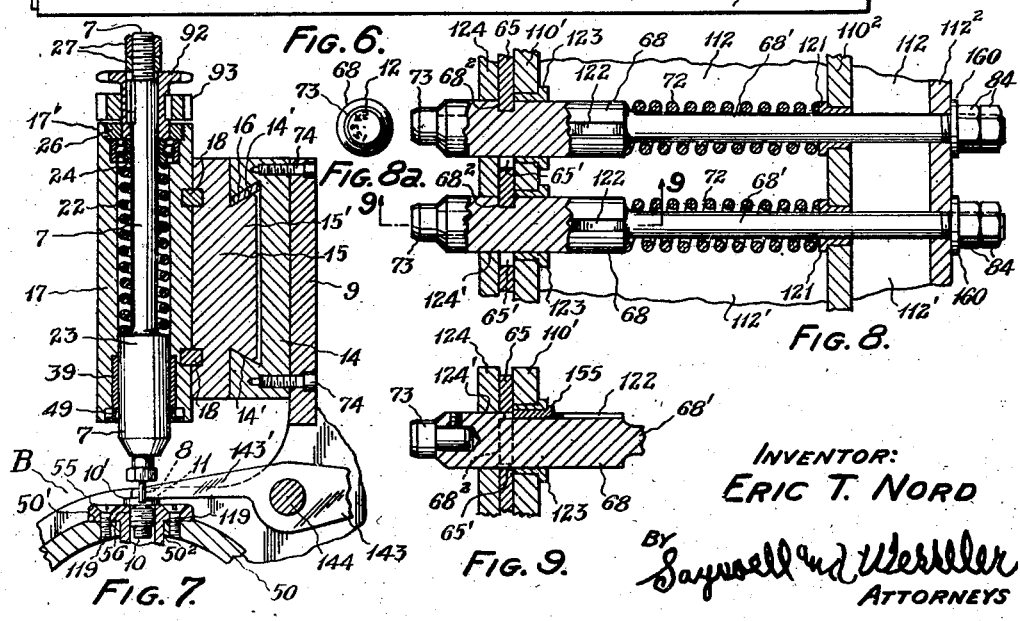
INVENTOR:
ERIC T. NORD
ATTORNEYS

INVENTOR:
ERIC T. NORD
ATTORNEYS

Aug. 14, 1945.　　　　E. T. NORD　　　　2,381,921
MILLING AND MARKING MACHINE
Filed July 26, 1943　　　6 Sheets-Sheet 4

INVENTOR:
ERIC T. NORD
BY Saywell and Wetler
ATTORNEYS

Aug. 14, 1945.  E. T. NORD  2,381,921
MILLING AND MARKING MACHINE
Filed July 26, 1943   6 Sheets-Sheet 5

INVENTOR:
ERIC T. NORD
BY Saywell and Wessler
ATTORNEYS

Aug. 14, 1945.  E. T. NORD  2,381,921
MILLING AND MARKING MACHINE
Filed July 26, 1943  6 Sheets-Sheet 6

INVENTOR:
ERIC T. NORD
BY Saywell and Wesseler
ATTORNEYS

Patented Aug. 14, 1945

2,381,921

UNITED STATES PATENT OFFICE 2,381,921

MILLING AND MARKING MACHINE

Eric T. Nord, Amherst, Ohio, assignor to U. S. Automatic Corporation, Amherst, Ohio, a corporation of Ohio Application July 26, 1943, Serial No. 496,169

7 Claims. (Cl. 29—38)

The invention relates to a milling and marking machine, and particularly to apparatus of this character adapted automatically to effect certain milling cuts simultaneously on a plurality of small work pieces and, also, during a cycle of operations, to mark the pieces with classification or identifying indicia, and eject the finished pieces from the machine. The entire cycle of operations is automatic with the exception of the initial feeding of the work pieces into certain work holders forming part of the machine.

The invention is particularly illustrated in the following description and accompanying drawings as applied to the milling and marking of tubular end-flanged articles known as primer bodies.

The annexed drawings and the following description set forth in detail certain means illustrating the improved milling and marking machine, such means constituting, however, only one of the various forms in which the principle of the invention may be embodied.

In said annexed drawings:

Figure 1 is a front elevation of the improved milling and marking machine;

Figure 2 is a fragmentary plan view, upon an enlarged scale, particularly showing three of a bank of laterally aligned work pieces being subjected to a second of two certain consecutive milling operations, the view showing certain milling cutters in section and indicating a certain rotatable drum and work holders secured thereto in which the pieces are held during the operations effected thereon, the second milling operation indicated being substantially completed, this view being taken from the plane indicated by the line 2—2, Figure 1;

Figure 6 is a right side elevation of the milling and marking machine, taken from the plane indicated by the line 6—6, Figures 1 and 12;

Figure 7 is a fragmentary vertical longitudinal section, taken from the plane indicated by the line 7—7, Figure 1;

Figure 8 is a fragmentary plan section, upon an enlarged scale, taken from the plane indicated by the line 8—8, Figure 14, and particularly illustrating certain marking plungers, this view showing, however, several of the elements in positions respectively different from those shown in Figure 14, as will be hereinafter fully explained;

Figure 8a is an end view of one of the plungers shown in Figure 8, particularly illustrating the indicia upon the marking or die face of the plunger;

Figure 9 is a fragmentary vertical longitudinal section, taken from the plane indicated by the line 9—9, Figure 8;

Figure 10:
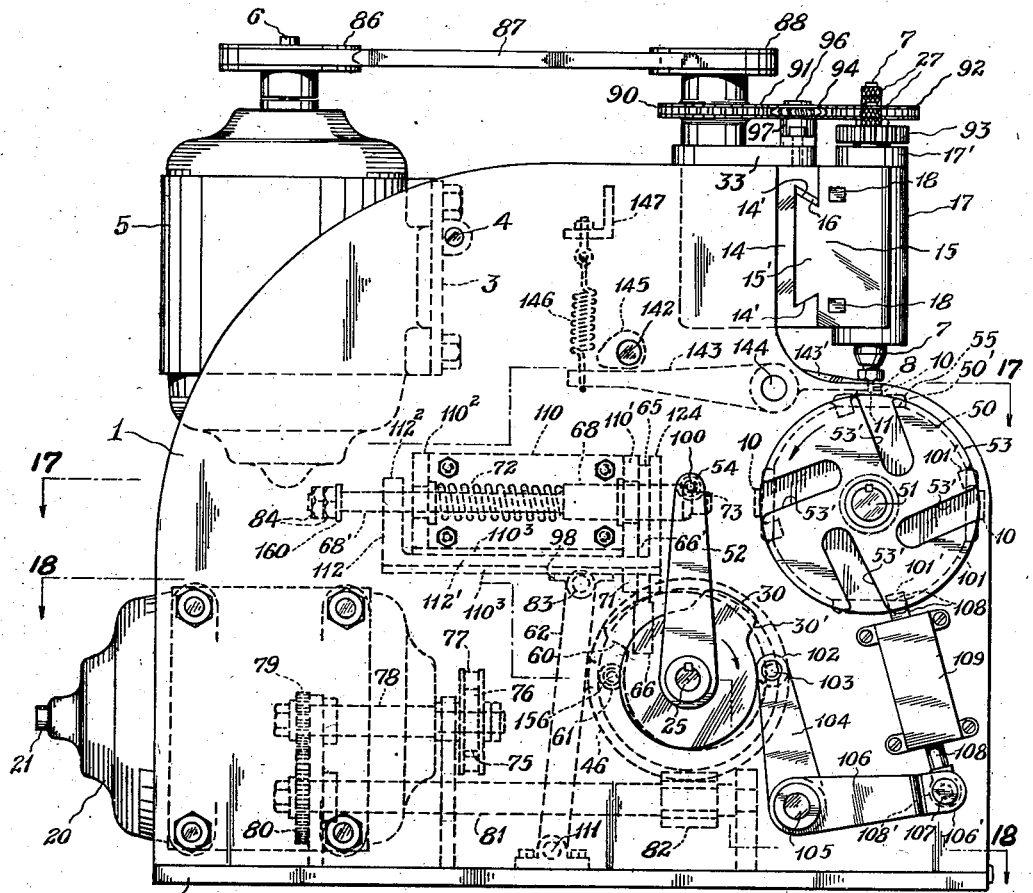
Figure 10 is a left side elevation of the milling and marking machine, taken from the plane indicated by the line 10—10, Figures 1 and 12.
Figure 14:
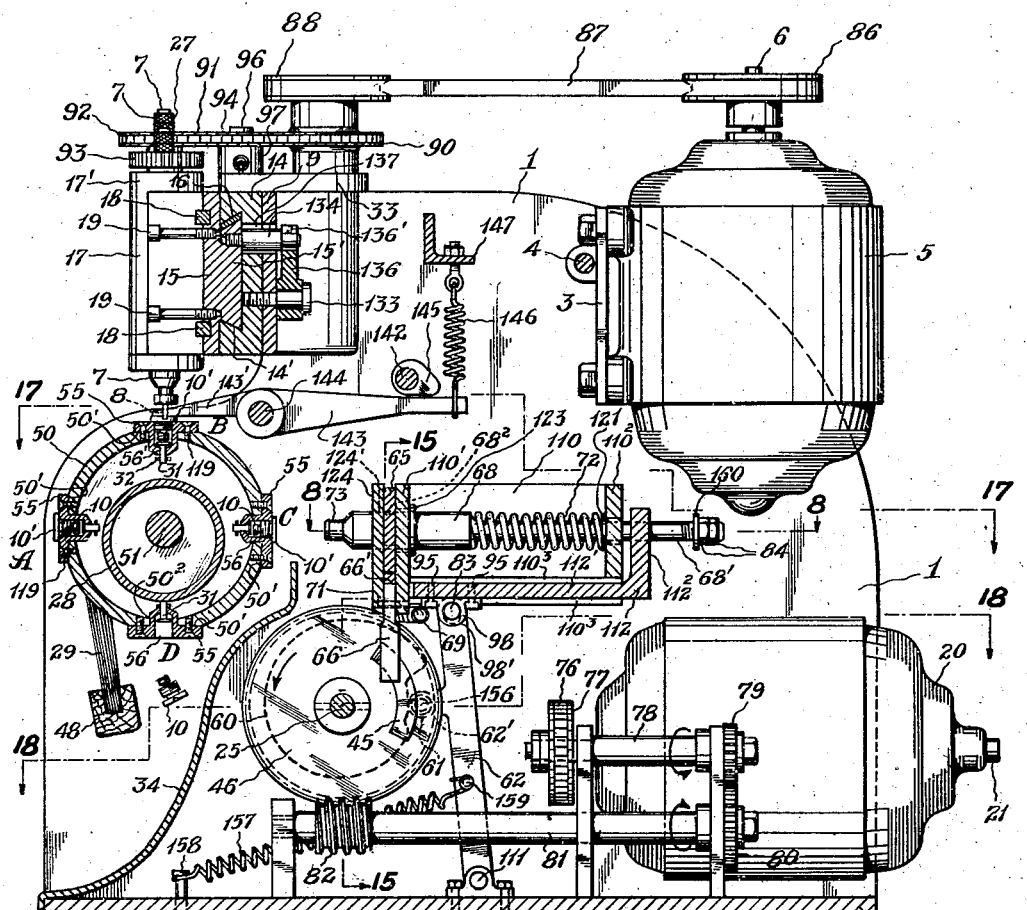
Figure 14 is a vertical longitudinal section of the complete milling and marking machine, taken from the planes indicated by the line 14—14, Figures 1 and 12.
Figure 17:
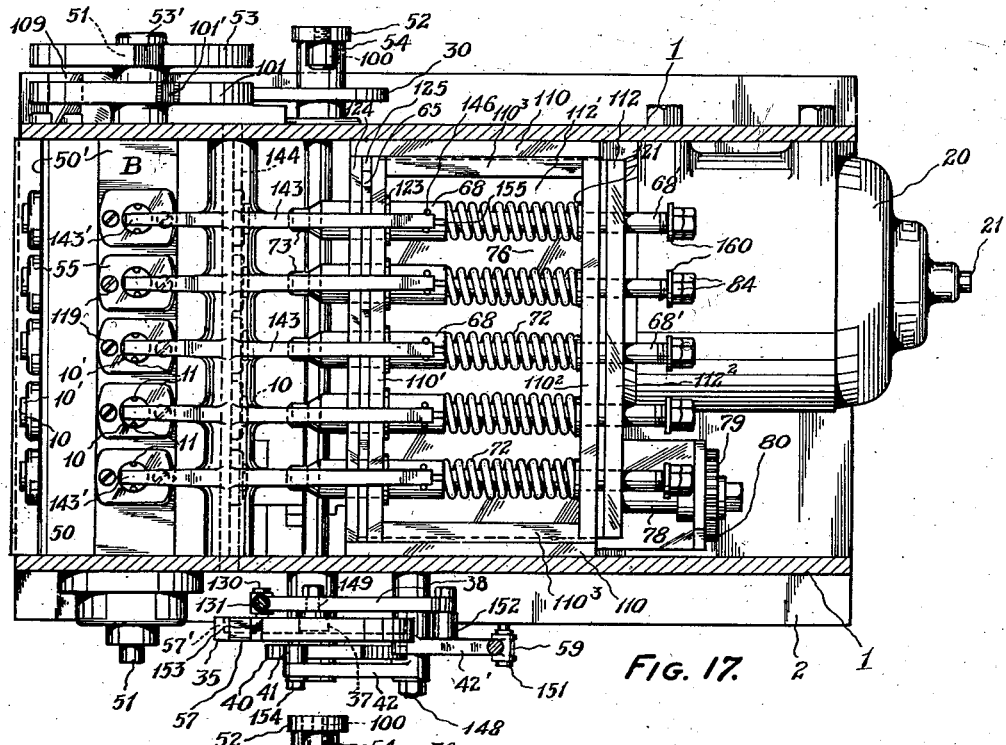
Figure 18:
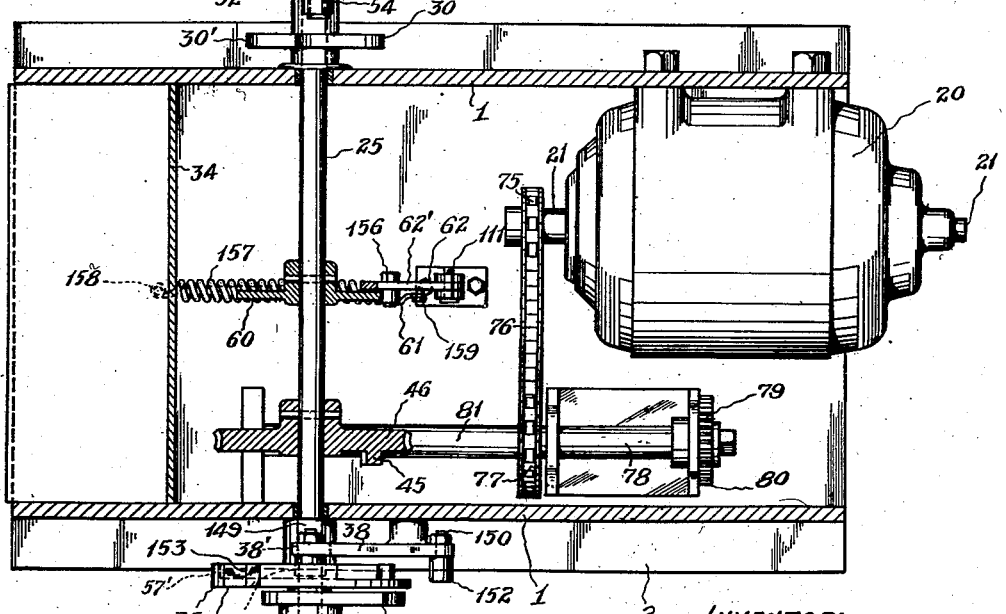

Figure 17 is a plan section of the complete milling and marking machine, taken from the planes indicated by the line 17—17, Figures 6, 10, and 14; and Figure 18 is a plan section of the complete milling and marking machine, taken from the planes indicated by the line 18—18, Figures 6, 10, and 14.

Referring to the annexed drawings in which the same parts are indicated by the same respective members in the several views, the main frame of the improved milling and marking machine includes opposed side plates 1 erected upon a base 2. Supported by a bracket 3 pivotally mounted on a transverse shaft 4 supported in the upper portion of the side plates 1 at the rear of the machine is a motor 5, and supported on the lower portion of the left side plate 1 at the rear of the machine is a motor 20. The motor 5 actuates a plurality of rotatable spindles 7, Figures 1, 6, 7, and 12, to effect the desired milling operations and the motor 20 actuates a cam shaft 25, Figures 1, 6, 10, 14, and 18, to which are secured on the left side of the machine a lever 52, Figure 10, for effecting certain indexing movements of a drum 50 upon which the work pieces 10 are mounted; and a cam 30 for controlling the locking of the drum 50 between indexing movements thereof; a cam 35, Figures 1, 6, 11a, and 18, upon the right side of the machine for effecting transverse movements of the rotatable milling spindles 7; a cam 40, Figures 1, 6, 12, and 18, upon the right side of the machine for actuating certain work-clamping fingers 143'; a worm wheel 46, Figures 14, 15, and 18, having a cam portion 45 secured to one face thereof for releasing certain spring-actuated marking plungers 68 from a holding plate; and a cam 60, Figures 14, 15, and 18, for effecting the retraction of the spring-actuated marking plungers 68, both of the cams 45 and 60 being secured to the cam shaft 25 intermediate the width of the machine, Figure 18.

Figure 1:
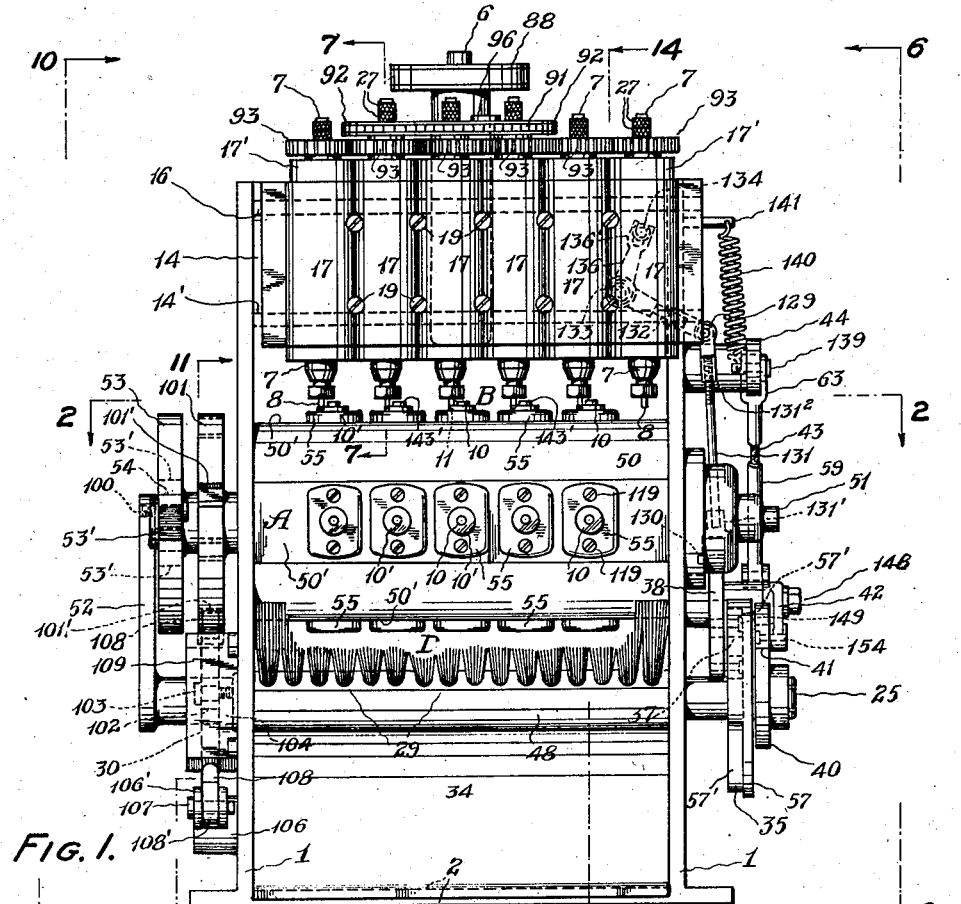
Figure 2:
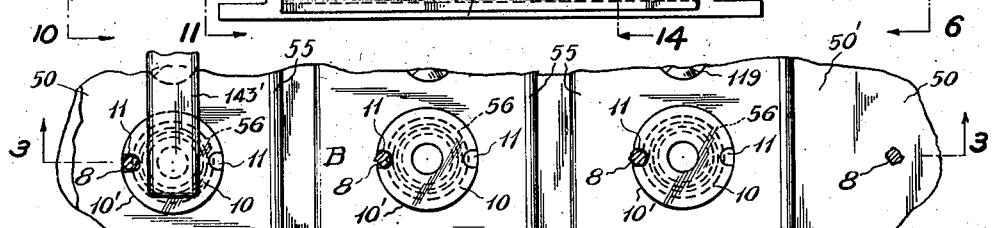
Figures 3, 4, 5:
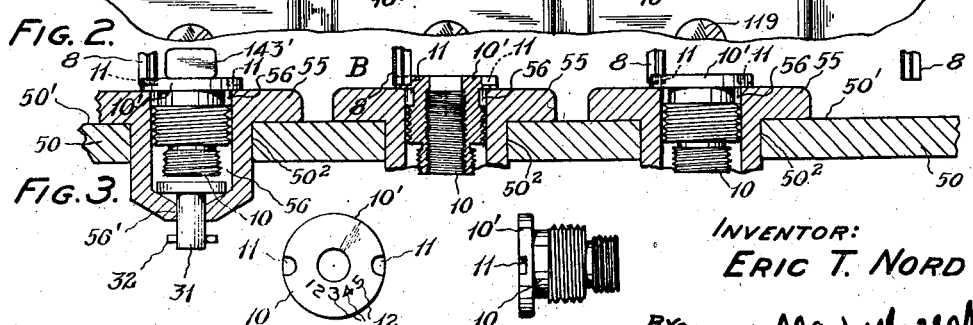
Figure 3 is a fragmentary transverse vertical section, taken in the plane indicated by the line 3—3, Figure 2.
Figure 4 is an end view of one of the work pieces after the complete operations of milling and marking have been effected thereon.
Figure 5 is a side elevation of the work piece shown in Figure 4.

The rotatable drum 50 in which the work pieces 10 are mounted while the milling and marking operations are effected thereon, and which makes one complete rotation while the cam shaft 25 is making four rotations, is formed in its outer surface with four plane surfaced recesses 50', Figures 1, 3, and 14, each adjacent two of which are a quadrant apart, in each of which recesses is secured by screws 119 a series of transversely aligned plates 55, five plates 55 to a series, each plate 55 forming a work holder and having a cylindrical hole 56 therethrough aligned with a hole $50^2$ through the adjacent portion of the drum 5 whereby a work piece 10, Figures 2 and 3, can be inserted in said holes with its inner end extended into the interior of the drum 50 and a flange 10' formed on its outer end and limiting its inner movement lying flush at the inner face of the flange with the outer face of the work-holding plate 55, Figures 3 and 14. In order that a freely rotating ejecting tube 28, hereinafter more fully mentioned, shall not roll upon the inner ends of the work piece 10, the plates 55, Figures 3 and 14, are formed with inwardly-extending extensions seated in the holes $50^2$ and having inner-end holes 56' through which extend end-flanged knock-out pins 31 provided inwardly of the plate extensions with transverse retaining pins 32.

Before describing further detail of the machine assembly, the sequence of operations will be outlined to wit:

A complete cycle of operations comprises the manual filling of one bank of work holders 55 with work pieces 10, a milling of the work pieces 10 upon diametrically opposed portions of the flanges 10' thereof, as indicated by the milling cuts 11, Figures 2, 3, 4, and 5, a stamping of the desired identifying indicia upon the outer faces of the flanges 10', as indicated by the marking 12, Figures 4 and 8a, and the ejection from the drum 50 of the work pieces 10 thus milled and marked. While one bank of work pieces 10 is being manually inserted in the work holders 55, another bank is being milled, and a third bank is being marked. These operations are effected between indexing movements of the drum 50 and while the latter is stationary. The ejection of the completed work pieces 10 is effected during an indexing movement of the drum 50.

Figures 11, 11A:
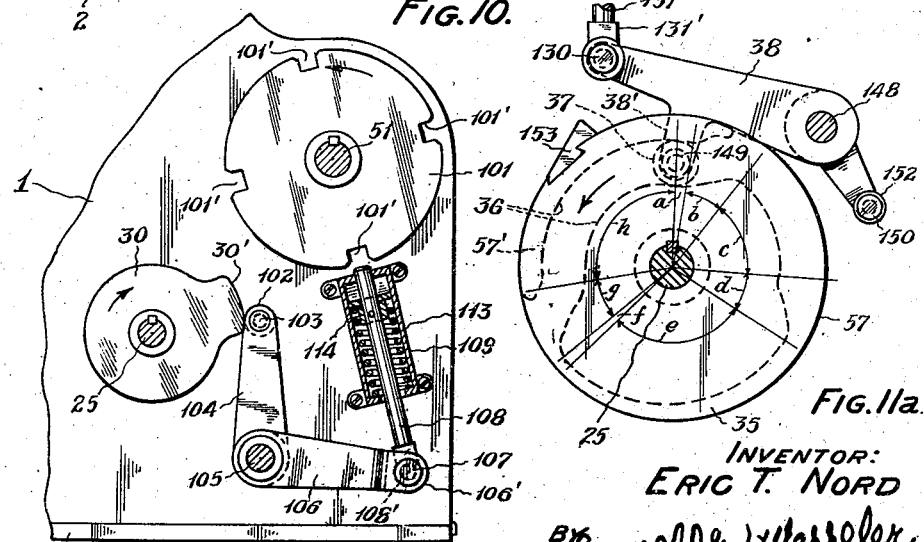
Figure 11 is a fragmentary vertical longitudinal section, taken from the planes indicated by the line 11—11, Figures 1 and 12, and showing certain elements illustrated in Figure 10, this view showing these elements in positions respectively different from those shown in Figure 10.
Figure 11a is an enlarged side elevation of a certain cam and associated levers detached from the machine.

After the various operations have been completed on the several banks of work pieces 10, a certain spring-actuated drum-holding plunger 108, Figure 11, is retracted to permit the fourth indexing ninety degree movement of the drum 50 to complete a cycle of its movements. The drum-holding plunger 108 is retracted four times during a complete cycle, i. e., during one complete rotation of the drum 50, and the latter is indexed 90° during each such retraction, i. e., to move each bank of the work holders 55 from one station to the next respective station, which stations will now be particularly described. The fourth indexing movement of the drum carries that bank of work holders 55 secured thereto shown at the bottom in Figures 1 and 14, to a position at the front end of the machine. This front position of the work holders 55 is designated station A, Figure 14, and is the position in which a fresh batch of work pieces 10 is loaded manually into a bank of work holders 55. Of course, if the operation of the machine is just being started, station A would indicate the position for the start of the first cycle. But, assuming the machine has been previously started, the work holders 55, a quadrant in advance of those shown in elevation in Figure 1, are on the top of the drum 50 and are loaded with work pieces 10 which are being milled. This position is designated as station B, Figures 1 and 14. The work holders 55, 180° in advance of those shown in elevation in Figure 1, and also loaded with work pieces 10, are at the rear of the drum 50 shown in Figures 1 and 14 and diametrically opposed to the work holders shown at station A in elevation in Figure 1. This position is designated station C and is the station at which the work pieces 10 are marked and is particularly shown in Figures 14 and 16. The work holders 55 a quadrant to the rear of the work holders 55 at station A shown in elevation in Figure 1 are at the bottom of the drum, indicated at station D, and in moving to this bottom position there has been ejected therefrom, as illustrated in Figure 14, the work pieces 10 which have been milled and marked at stations B and C, respectively. These several operations comprise a complete cycle of operations.

Various portions or cooperative assemblies of the machine will now be described.

The detail of the drive by which the cam shaft 25 is actuated from the motor 20 comprises, Figures 10, 14, and 18, a sprocket 75 secured to the shaft 21 extended from the casing of the motor 20 and engaged by a chain 76 which also engages a sprocket 77 secured to and adjacent one end of a longitudinal shaft 78 to whose other end is secured a gear 79 engaging a gear 80 secured to and adjacent one end of a parallel longitudinal shaft 81 adjacent whose other end is secured a worm 82 engaging a worm wheel 46 secured to the cam shaft 25.

Figures 12, 13, 13A:
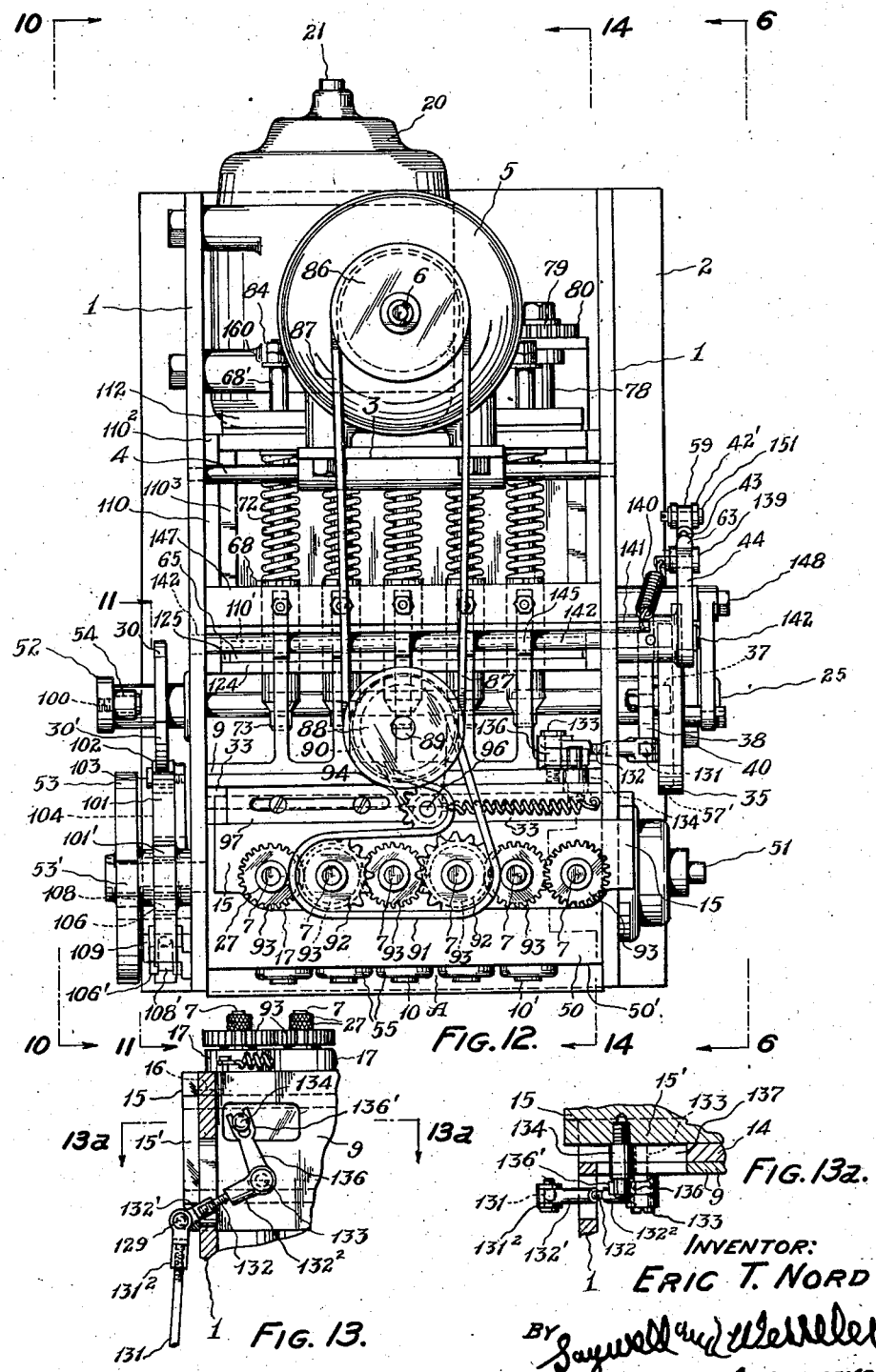
Figure 12 is a plan view of the complete milling and marking machine.
Figure 13 is a fragmentary transverse vertical section, taken from the planes indicated by the line 13—13, Figure 6.
Figure 13a is a fragmentary horizontal section, taken on the plane indicated by the line 13a—13a, Figure 13.

The detail by which the rotatable spindles 7, in whose lower ends depending milling cutters 8 are secured, are driven from the motor 5, Figures 1, 6, 7, 10, 12, 13, and 14, comprises a pulley 86 secured to the shaft 6 extended from the casing of the motor 5 and engaged by a longitudinally-extended belt 87 which also engages a pulley 88 secured adjacent the top of a vertical shaft 89 to which is also secured adjacent its bottom end a sprocket 90 engaged by a chain 91 which also engages a pair of transversely spaced sprockets 92, Figures 1 and 12, the chain 91 between the sprocket 90 and the sprockets 92 also engaging an idler take-up sprocket 94, rotatably mounted upon a pin 96 mounted in a bracket 97 slidable on a transverse top frame member 33 extended between the side plates 1. The sprockets 92 are secured to two of the rotatable spindles 7, the second and fourth, reading from the left, Figure 12. There are six of these spindles 7. Each of these spindles 7 is provided with a gear 93 rotatably fixed thereto adjacently below the horizontal plane of the sprockets 92, Figure 7, and each adjacent two of these gears 93 are rotatably engaged, so that all six of the rotatable spindles 7 are rotated from the two sprockets 92. It may be stated that the reason for having six rotatable spindles 7 for milling a bank of five work pieces 10 is that the work pieces 10 are each milled upon diametrically opposite portions of the flanges 10' thereof and the milling of any one work piece 10 is effected by an adjacent two of the milling cutters 8 which, between consecutive milling operations, are shifted laterally of the machine a distance substantially equal to the distance between the milled recesses of adjacent work pieces 10, so that the intermediate four milling cutters each performs two milling operations, one each upon two adjacent work pieces 10, and the two end milling cutters 8 each performs one milling operation, and that operation is upon the outside of the two respectively adjacent end work pieces 10, the outside milling cutters 8 running idle while the milling operations are being effected upon the inside portions of the respective two end work pieces 10. This action will be clearly seen in Figure 1 in which the right-hand end milling cutter 8 is running idly while the other five milling cutters 8 are effecting milling operations upon the left sides of the five respective work pieces 10. The milling cutters 8 run continuously during the operation of the machine, being spaced about midway between milling positions during the indexing movements of the drum 50, as hereinafter fully explained.

The detail by which the indexing of the drum 50 is effected comprises, Figures 1, 10, 11, and 12, transversely opposed spaced disks 53 and 101 which, Figures 1 and 12, are secured adjacently exterior of the left-hand side plate 1 to the transverse shaft 51 to which the drum 50 is secured, of which disks 53 and 101 the disk 53 is the outer one and is formed with four obliquely arranged slots 53' which pass entirely through the body of the disk 53, and whose outer ends are open at the periphery of the disk 53, the axes of these slots 53' at these outer ends being a quadrant apart. These slots 53' are adapted to receive a roller 54 rotatably mounted upon a pin 100 mounted in the outer end of an actuating arm 52 whose inner end is secured to the cam shaft 25. The pressure of the roller 54 upon the walls of the slots 53' effects the indexing movements of the drum 50. The positions of the arm 52 and the slots 53' just immediately preceding the movement of the roller 54 into the peripheral opening of the left-hand slot 53' is indicated in Figure 10, as also the position of a certain spring-actuated holding plunger 108 which, in cooperation with the disk 101, insures the fixed position of the drum 50 between indexing movements thereof. The disk 101 is formed with four peripheral recesses 101' the axes of each adjacent two of which are a quadrant apart. These recesses 101' are respectively slightly in advance of the adjacent slots 53' of the disk 53. At the end of an indexing movement of the drum 50 one of the pairs of diametrically opposed recesses 101' is substantially axially aligned with the spring-actuated holding plunger 108. The retraction of the spring-actuated holding plunger 108 is indicated in Figure 11, which is a view of a slightly advanced position compared with that shown in Figure 10, and is a view of the indexing position when the roller 54 is engaging the left-hand slot 53' and riding therein to turn the disk 53 and hence the shaft 51 and hence the drum 50 to effect the indexing movement. Retraction of the spring-actuated holding plunger 108 from the adjacent slot 101' of the pair of slots 101' axially aligned therewith is effected by the extended portion 30' of the cam 30 and takes place concurrently with the movement of the arm 52 to a position where it is about to enter a slot 53'. The connection between the cam portion 30' and the plunger 108 comprises a roller 102 rotatably mounted upon a pin 103 at the free end of one arm 104 of a bell crank lever and engaging the cam 30, the bell crank lever being pivotally mounted on a pin 105, the other arm 106 of the bell crank lever having a clevis end portion 106' provided with a pin 107 upon which a socketed hub portion 108' of the plunger 108 is rotatably mounted, the plunger 108 passing through a spring barrel 109 in which is a sliding head 114 secured to the plunger 108 and intersected thereby and against which bears one end of a compression spring 113 whose other end is seated upon the base of the spring barrel 109. The plunger 108 is permitted by the cam 30 to be moved inwardly of the disk 101 under the action of the spring 113 to engage a slot 101' when an indexing movement of the drum 50 has moved the axis of the slot 101' approximately into alignment with the axis of the plunger 108, the roller 54 on the arm 52 being withdrawn at substantially the same time from the slot 53' adjacent the slot 101', thus stopping the indexing movement of the drum 50 which also is secured to the shaft 51 and holding the drum stationary.

Each revolution of the cam shaft 25 effects one withdrawal of the spring-actuated plunger 108 and one engagement of the roller 54 on the arm 52 with a slot 53' of the disk 53 to effect a ninety degree indexing movement of the drum 50.

The detail whereby the milling cutters 8 are moved crosswise in both directions to effect milling operations upon diametrically opposed portions of the work pieces 10 comprises, Figures 1, 6, 11a, 12, and 13, a cam 35 secured to the cam shaft 25 a spaced distance from and somewhat exteriorly of the right-hand side plate 1, together with cooperating mechanisms including a roller 37 engaging the cam 35, this cam 35 being a grooved cam whose effective roller-engaging surface is clearly indicated in Figures 6 and 11a, the grooved portion of the cam being marked 36, and an outer diametrically enlarged plate or side face of the cam being indicated by 57. The cam plate 57 is formed with a laterally-directed peripheral extension 57', clearly seen in Figure 1, which defines the groove 36 and whose inner surface conforms to the respectively opposed portions of the effective roller-engaging surface of the cam 35.

The roller 37 is indicated in Figures 6 and 11a in the position in which the second and final milling operation is substantially completed and the milling cutters 8 are about to be moved into their respective central or neutral positions preliminarily to a dwell period within which an indexing movement of the drum 50 through a quadrant will be effected. Using the position of the roller 37 indicated in Figures 6 and 11a as a starting point, a complete cycle of operations will now be described:

First, a short dwell period during a small arc movement of the cam 35, indicated by a, Figure 11a, then a comparatively rapid movement of the milling cutters 8 to central or neutral positions relative to the adjacent work pieces 10, during an arc movement of the cam 35, indicated by b, then a dwell of the milling cutters 8 at the central or neutral positions for a certain arc movement of the cam 35, indicated by c, while an indexing movement of the drum 50 is being effected, then a comparatively rapid non-cutting movement of the milling cutters 8 transversely in one direction to points adjacent the portions upon one side of the respective adjacent work pieces 10 which are to be milled, during a certain arc movement of the cam 35, indicated by d, then a comparatively slow transverse cutting movement of the milling cutters 8 in the same direction to effect the milling operation upon said portions of the flanges 10' of the work pieces, during a certain arc movement of the cam 35, indicated by e, then a short dwell period during a small arc movement of the cam 35, indicated by f, then a comparatively rapid movement of the milling cutters 8 in the opposite direction to positions adjacent the other side portions of the adjacent work pieces 10 which are to be milled, through an arc movement of the cam 35, indicated by g, when the roller 37 drops into the groove 36, then a comparatively slow movement of the milling cutters 8 in the same direction to effect the second milling operation upon the flanges 10' of the work pieces 10, through an arc of cam movement indicated by h, at which point a cycle has been completed insofar as a description of all parts thereof is concerned, although, as before stated, this particular described cycle was commenced at the end of the second milling operation inasmuch as the cam roller 37 in Figures 6 and 11a is shown at that point.

It will be understood that the movements of a milling cutter 8 just described result in any one milling cutter, with the exception of the right and left hand milling cutters of the six milling cutters, effecting one milling operation upon each of two adjacent work pieces 10, upon the left-hand side of one work piece and the right-hand side of the adjacent work piece. This action will be clearly understood from an inspection of Figure 1. One of the end milling cutters 8 runs idly during each one of these milling periods, the right-hand end milling cutter 8 in Figure 1 running idly when the other five cutters are working upon the left-hand sides of the five work pieces 10, and the left-hand cutter 8 in Figure 1 running idly when the other five cutters are working upon the right-hand sides of the work pieces 10.

The roller 37 is rotatably mounted upon a pin 149 fixed, interiorly of the cam 35, in a short dependent extension 38' of an angular rock arm 38 and intermediate the ends of one portion of the latter, which arm 38 is pivotally mounted on a pin 148, the end of this portion of the arm 38 being pivotally connected with a pin 130 with which is also pivotally connected the socketed hub 131' of an upwardly extending link 131, Figures 1, 6, and 13, which at its upper end is threaded in a socketed hub $131^2$ pivotally secured to a socketed hub 132' by a pin 129 upon which both of hubs $131^2$ and 132' are pivoted and in the latter of which hubs is secured one end of a rod 132 whose other end is secured in a socketed hub $132^2$ pivotally mounted upon a screw 133 secured in the rear frame member 9 and the slide backing 14, the hub $132^2$ forming with a lever extension 136 a rocker arm having a forked end 136'. The socketed hub 132' and the rod 132 pass through an opening formed in the right-hand frame member 1. The forked end 136' engages a bolt 134 secured to and seated in an extended portion 15' of a slide 15, Figure 7, in which the rotatable spindles 7 are mounted. The bolt 134 passes through the slide backing 14 formed with an opening 137, Figures 13a and 14, for the play of the bolt 134. The slide 15 has a rear dove-tailed sliding portion 15' which engages a complementary portion 14' formed upon the inner face of the slide backing 14. The latter is secured to a frame member 9 by screws 74 at the rear of the top portion of the machine immediately to the rear of the rotatable spindles 7. A gib 16 is provided at the top between the adjacent sliding surfaces of the members 14' and 15'. Thus, due to the contour of the effective surface formed upon the cam 35, the spindles 7 and hence the milling cutters 8, are traversed transversely of the work pieces 10 in the manner and in the sequence hereinbefore mentioned.

The other portion of the angular rock arm 38, Figure 6, extends downwardly and supports a roller 152 rotatably mounted on a pin 150 located at the lower end of the downward extension of this rock arm portion. A directing lug 153 extended outwardly from the cam plate 57 tilts the rock arm 38 by means of the roller 152 and positively forces downwardly the short dependent extension 38' of the rock arm 38 and, hence, the roller 37, so that the latter is directed into the groove 36 during the arcuate cam movement "g". The friction of the sliding portion 151 of the slide 15 in the dove-tailed slideway 14' of the backing 14 is sufficient to maintain the roller 37 in intimate contact with the actuating surfaces of the cam 35 and to prevent the roller 37 from moving away from these cam surfaces.

Means are provided whereby the work pieces 10 are clamped in the work holders 55 when they are in the milling position. This action is effected by clamping finger portions 143' of longitudinal rocker arms 143 mounted upon a transverse shaft 144, Figures 6, 10, 12, and 17, the rear end body portion of the rocker arms 143 being controlled by vertical springs 146 so as to cause the clamping fingers 143' normally to bear down upon the flanges 10' of the work pieces 10. One end of each spring 146 is secured to an angle 147 mounted upon and extended between the side plates 1 and the other end to the rear end of a rocker arm 143. In order to effect the release of the work pieces 10 from the holding pressure of the fingers 143', when one bank of work pieces 10 is leaving and the following bank of work pieces 10 is entering the milling station B at the top of the drum 50, a cam 40, Figures 1, 6, and 12, is secured to the cam shaft 25 adjacently exterior of the milling cam 35 and is engaged by a roller 41 pivotally mounted upon a pin 154 which is secured in one end portion 42 of a rocker arm, the other end portion 42' of which pivotally supports a pin 151. Intermediate its ends the rocker arm 42—42' is pivotally mounted upon the pin 148. Upon the pin 151 is also pivotally mounted a link consisting of a socketed hub 59 formed with a threaded extension 43 engaged at its opposite end in a tapped hub 63 pivotally secured by a pin 139 to an end portion of a rocker arm 44 pivotally mounted adjacent its opposite end upon a transverse shaft 142 to which is secured a series of rocker cams 145 disposed adjacent the bodies of the respective rocker arms 143 but normally slightly spaced therefrom. However, when an extended portion 40' of the cam 40, Figure 6, is engaged by the roller 41, the arm 44 is rocked to cause the cams 145 to bear upon the clamping arms 143 to rock the same against the action of the springs 146 and thus lift the clamping fingers 143' upwardly away from the flanges 10' of the work pieces 10. Normally the cams 145 are held in non-effective position relative to the rocker arms 143 by a tension spring 140 secured at one end to the pin 139. The other end of the spring 140 is secured to a pin 141 mounted in and projecting from the adjacent side frame member 1.

The means for stamping the work pieces 10 with identifying indicia at station C of the rotatable drum 50 are particularly shown in Figures 8, 9, 10, 14, 16, and 17. The stamping is done by spring-actuated longitudinal plungers 68 having rear stem portions 68' and provided at their front ends with die members 73. The plungers 68 are slidably mounted in the front plate 110' of a fixed bed member 110, and the stem portions 68' thereof are slidably mounted in the rear plate 110² of the bed member 110 and in the vertical leg 112² of a longitudinally movable angular member 112 having a longitudinal base portion 112' slidable on inwardly-extending base flanges 110³, Figure 15, of the bed 110. Compression springs 72 are mounted in the bed 110 around the plunger stems 68' between the rear abutment face of the plunger 68 and the inside rear face of the rear bed plate 110². The springs 72 are under compression when the longitudinally movable plungers 68 are in their rear position, such as shown in Figure 14, but, when these springs 72 are free to act, they drive the plungers 68 rapidly forward to cause the dies 73 to make the desired marking 12, Figures 4 and 8a, upon the flanges 10' of the work pieces 10 secured in the work holders 55 at the station C, Figures 14 and 16.

Figures 15, 16:
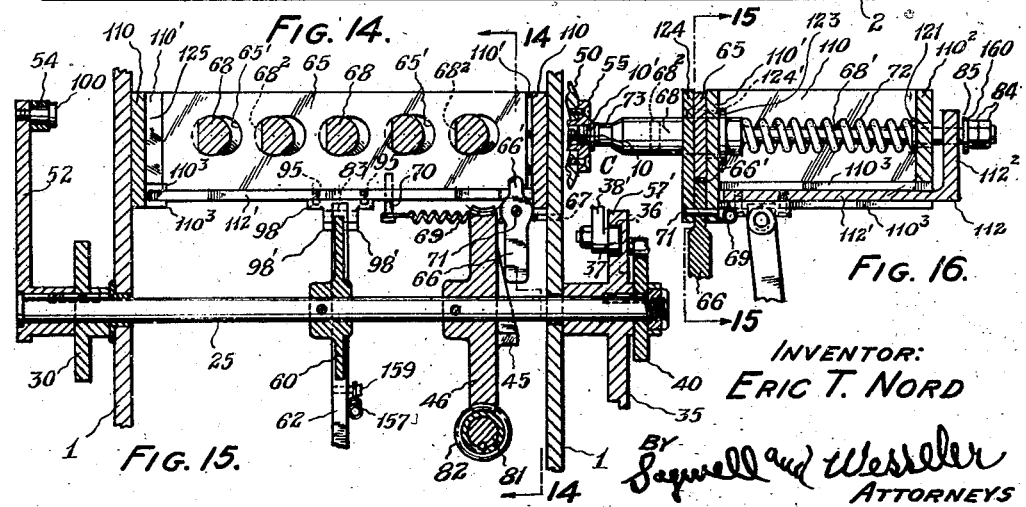
Figure 15 is a fragmentary transverse vertical section, taken from the planes indicated by the line 15—15, Figures 14 and 16.
Figure 16 is a fragmentary showing of certain elements appearing in Figure 14, particularly illustrating the marking position of one of the spring-actuated plungers which is indicated in Figure 14 in its retracted position, the work piece being marked and the work holder and a fragment of the rotatable drum to which the holder is secured being also shown in this view.

The means for holding the plungers 68 in their rearmost position and thus keeping the springs 72 compressed is a transversely movable plate 65, Figures 8, 9, 14, 16, and 17 which, in one transverse position, its right-hand position as shown in Figure 17, engages notches 68², Figures 8 and 15, formed in the left side faces of the plungers 68 and which, in its left-hand position, is disengaged from said notches. 125, Figures 15 and 17, indicates a free space adjacently forwardly of the front bed plate 110' into which the plate 65 can move transversely to its plunger disengaging position. This plate 65 is formed with enlarged generally elliptical holes 65' through which the plungers 68 can slide except when the left-hand walls of the holes engage the notches 68² of the plungers 68 in the right-hand position of the plate 65. The rear face of this plate 65 is aligned flush with the front face of the front end member 110' of the bed 110 and its front face with the rear face of a transverse support plate 124 over which it slides. The support plate 124 Figures 8 and 14, is formed with holes 124' through which the plungers 68 slide.

Annular metal bushings 121 and 123, Figures 8 and 9, respectively, are driven into or otherwise fastened in the rear bed plate 110² and the front bed plate 110' of the bed member 110. A key 155, Figure 9, is fixed in the bore of the bushing 123, which key 155 engages a keyway 122 in the plunger 68. The bushings 121 and 123 provide sliding surfaces for the plunger stems 68' and the plunger bodies 68. The key 155 and the keyway 122 serve to rotatably fix the plungers 68 so that the location of the indicia 12 on the work piece 10 may be controlled.

The transversely movable holding plate 65 is retracted or moved to the left by a trigger 66, Figures 14, 15, and 16, which is pivoted intermediate its ends on a pin 71 mounted in the support plate 124, Figures 14 and 15. This trigger 66 has an upper nose portion 66' which engages the plate 65 adjacent the right-hand end of the latter and thus moves the plate 65 to the left, as indicated by the space 125, Figures 15 and 17, against the action of a tension spring 69, when the lower end of the trigger 66 is engaged by the beveled cam portion 45 provided upon the right-hand face of the worm wheel 46. Such left-hand movement of the holding plate 65 releases the plungers 68 and thus permits the marking operation by the dies 73 of the plungers 68 under the impulse of the springs 72. The identifying indicia 12 marked on the flanges 10' of the work pieces 10 by the plunger die 73 is indicated in Figures 4 and 8a. As soon as the cam portion 45 passes the trigger 66, the plate 65 is moved to the right by the spring 69 so that the plate 65 can again engage the notches 68² and lock the plungers 68 when the latter are retracted. The spring 69 is secured at one end to a pin 70, Figure 15, depending from the base of the plate 65 and at its other end to a pin 67 secured in the right-hand frame member 1.

The retraction of the plungers 68 to permit their being locked and to effect the compression of the springs 72 is effected from the cam 60, Figures 14, 15, and 18, which is engaged by a roller 61 rotatably mounted on a pin 156 fixed in a short rearwardly extending ear 62' of an actuating lever 62 pivoted at its lower end upon a pin 111 fixedly supported on the base 2, which lever 62 has loose pivotal connection at its upper end with a pin 83 secured in opposed ears 98' of a bracket 98 fastened by screws 95 to the under face of the base 112' of the angular member 112. As soon as the roller 61 is released from the high point of the cam 60, i. e., as soon as the springs 72 are fully compressed and the plungers 68 locked by movement to the right of the plate 65, the lever 62 is pulled forwardly by a tension spring 157, Figures 14 and 18, secured at one end by a pin 158 to the base 2 and at its opposite end to a pin 159 mounted in the lever 62. This action pulls the angular member 112 forwardly from the position shown in Figure 8 to the position shown in Figure 14. The plungers 68 are not affected by this last-mentioned movement of the member 112.

The plunger stems 68' are provided at their rear ends with fixed abutments 160 which, however, can be adjustably fixed by means of the nuts 84, against which abutments 160 the upright portion 112² of the angular member 112 presses when the plungers 68 are being retracted to compress the springs 72. As before stated, the base 112' of the member 112 slides on the base of the fixed bed 110.

The retracting movement of the plunger 68 causes the keyway 122 thereof, Figure 9, to slide through the bushing 123 and, when the portion 112² of the member 112 reaches the abutment 160 and carries it rearwardly to the position shown in Figure 8 and, hence, the retractive movement is finished, the front end of the keyway 122 is closely adjacent the front of the bushing 123, as shown in Figure 9. This Figure 9, like Figure 8, is a showing of the respective positions of the several elements when the plungers 68 are fully retracted but before the angular member 112 moves forwardly to the position shown in Figure 14 in the manner hereinbefore mentioned. Thus, as soon as the high portion of the cam 60 has completely passed the roller 61, the pivoted lever 62 and, hence, the angular member 112, is pulled forwardly by the spring 157 and the several elements assume the respective positions shown in Figure 14; whereas, as stated, the complete rearward movement of the member 112 is shown in Figure 8. The abutments 160 are so adjusted that the stroke of the plungers 68 during their marking action does not cause the abutments 160 to contact the portion 112² of the member 112, during such marking movement, as indicated by the space 85, Figure 16, which view is a showing of the positions of the several elements at the time of marking.

The ejecting of the milled and marked work pieces 10, while the drum 50 is making its third indexing movement, between the stations C and D, Figure 14, is effected by a cylindrical tube 28 which rolls freely within the chamber of the drum 50 and tends to stay on the bottom of the drum 50 by gravity as the latter rotates. Inasmuch as the inner ends of the knock-out pins 31 extend into this drum chamber and are freely movable through the work-plate extension holes 56' and their flanged ends can engage the inner ends of the work pieces 10 within the extended portions of the work holders 55, the weight of the tube 28 moves the knock-out pins 31 against the inner ends of the work piece 10 and ejects them from the work holders 55 and outwardly of the drum 50 whence they are directed by a guard or chute 34 outwardly of the machine, Figure 14.

In order that the surfaces of the work holders 55 may be kept clear of chips, grit or other obstructions, an upwardly-extended flexible brush 29, Figure 14, seated at its base in a transversely extended frame member 48 plays at its upper end over these work holder surfaces as the drum 50 is rotated.

The transversely movable slide in which the rotatable spindles 7 are mounted is a multiple-part member consisting of the main slide portion 15 and the plurality of spindle housings 17, Figure 7, which are aligned with the main slide portion 15 by keys 18. Furthermore, the spindle housings 17 are secured to the slide portion 15 by bolts 19 which pass through adjacent contacting portions of the annular housings 17 and are threaded in the main slide portion 15, Figures 1 and 14. Surrounding the upper stem portions of the spindles 7 are compression springs 22 which bear at their lower ends against lower enlarged sliding abutment portions 23 of the spindles 7 and at their upper ends against fixed ball races 24. These ball races 24 are fixed by threaded collars 26 which engage upwardly-extending flanges 17' of the spindle housings 17. Sleeve liners or bushings 39 are provided for the enlarged spindle abutment members 23; as also, oil seals 49.

Certain adjustments of the machine elements are provided as follows:

The transverse strokes of the rotatable spindles 7 may be varied by adjustments of the link 131 and the rod 132 which, it will be noted, are of turnbuckle construction by reason of their threaded engagement at least at one of their two ends with the socketed hub members 131' and 131² and socketed hub members 132' and 132², respectively, Figures 6 and 13. The stroke of the holding-finger-releasing cams 145 can be varied by an adjustment of the link 43 which has screw-threaded engagement at least at one of its two ends with the socketed hub members 59 and 63. The depth of the milling cuts can be varied by adjustments of the nuts 27, 27 engaging the tops of the spindles 7 and bearing upon the hubs of the sprockets 92 or gears 93.

Claims to the milling machine combination disclosed in the instant application are presented in applicant's pending application upon Milling mechanisms, Serial No. 542,412.

Claims to the combination of means for marking a metal shape disclosed in the instant application are presented in applicant's pending application upon Work-marking assemblies for machine tools, Serial No. 542,413.

What I claim is:

1. A milling and marking machine having a frame, a rotatable milling spindle mounted therein for sliding movement, means for rotating the spindle, means for imparting periodic sliding movements to the spindle, a drum rotatably mounted in the frame, radially spaced work-holders mounted on the drum, means for imparting periodic rotating indexing movements to the drum, work-marking means effective adjacent to the work-holders, the assembly being such as, by the rotation of the drum, to bring the work-holders successively adjacent a dwell position of the drum for loading, another dwell position of the drum for milling, and still another position of the drum for marking, means for holding the drum from rotating, means for periodically rendering the holding means ineffective, gravity-actuated means rendered effective by the rotation of the drum for ejecting work from the holders during the rotation of the drum, and means for coordinating in timed relation the functions of the spindle-sliding means, the indexing means, the drum-holding means, the means for rendering the holding means ineffective, and the marking means.

2. A milling and marking machine having a frame, a plurality of laterally spaced milling spindles mounted in the frame as a single unit for sliding movement, means for rotating the spindles, means for imparting periodic sliding movements to the spindle unit, a drum rotatably mounted in the frame, means for imparting periodic rotating indexing movements to the drum, radially spaced work-holders mounted on the drum, each work-holder comprising a plurality of laterally spaced work-holding parts, the assembly being such as, by the rotation of the drum, to bring the work-holders successively adjacent to the path of sliding movement of the spindle unit, means for holding the drum from rotating, means for periodically rendering the holding means ineffective, work-marking means effective adjacent the work-holders at one dwell position of the drum, the spindle-sliding means functioning, at times, to move the respective spindles between dwell positions, which are intermediate adjacent work-holding parts, and milling positions contiguous to such parts, and functioning, at other times, to move the respective spindles from one such milling position to the other milling position, and means for coordinating in timed relation the functions of the spindle-sliding means, the indexing means, the drum-holding means, the means for rendering the holding means ineffective, and the marking means.

3. A milling and marking machine having a frame, a milling block mounted therein for sliding movement, a rotatable spindle mounted in the block, means for rotating the spindle, a shaft rotatably mounted in the frame, means for rotating the shaft, a cam secured to the shaft and connections actuated by the cam and secured to the spindle block for sliding the latter, the cam structure being such that the block is actuated through a series of differential sliding movements alternated with dwells, a second shaft rotatably mounted in the frame, an indexing drum secured to the second shaft, a radially spaced series of pairs of transversely spaced work-holders mounted on the drum, clamping fingers and means normally rendering the same effective on the work holders at a dwell position of the drum, a second cam secured to the first-mentioned shaft, means actuated by the second cam and periodically rendering the clamping fingers ineffective as the work-holders enter and leave said dwell position of the drum, means normally holding the drum stationary, a third cam secured to the first-mentioned shaft and means actuated thereby rendering the drum-holding means ineffective, means secured to the first-mentioned shaft and periodically engaging the drum to index the latter when the drum-holding means are ineffective, work-marking means, means normally holding the same a spaced distance from and in alignment with a dwell position of the drum, a compression spring tending to cause the work-marking means to impinge upon a work-holder at said second dwell position, a fourth cam secured to the first-mentioned shaft and means actuated thereby to render the work-marking holding means ineffective, a fifth cam secured to the first-mentioned shaft for retracting the work-marking means against the tension of the compression spring, the functions of the drum-indexing means, the spindle block sliding means, the drum-rotation holding means, the clamping finger means, the work-marking means, and the elements auxiliary thereto, all being coordinated in timed relation to effect the following actions in succession relative to any one pair of transversely spaced work-holders, a loading dwell of the drum, an indexing movement, a release of the clamping fingers, a clamping of the fingers and a milling dwell, a release of the clamping fingers, an indexing movement, a marking dwell, an indexing movement, an idle dwell, and an indexing movement, and gravity-actuated means rendered effective by the rotation of the drum and knock-out means actuated by said gravity-actuated means for ejecting work from the work-holders during the two last-mentioned indexing movements and the idle dwell.

4. A work-holder and work-ejecting means comprising a rotatable drum having a work-receiving opening through the peripheral body thereof, a work-holding plate mounted on the peripheral surface of the drum and having a work-receiving opening aligned with the drum opening, knock-out means mounted in the opening of the work-holding plate, movable axially thereof, and extended into the drum interior, and a tube within the drum and free to roll therein by gravity, whereby the weight of the tube, as the drum rotates, ejects outwardly of said aligned openings any work extending therethrough into the drum interior.

5. A work-holder and work-ejecting means comprising a rotatable drum having a work-receiving opening through the peripheral body thereof, knock-out means extended into the drum interior, means mounted on the drum for movably supporting the knock-out means in alignment with the work-receiving opening, and a member in the drum free to tumble by gravity against the extended portion of the knock-out means.

6. A work-holder and work-ejecting means comprising a rotatable drum having a work-receiving opening through the peripheral body thereof, knock-out means extended into the drum interior, means mounted on the drum for movably supporting the knock-out means in alignment with and adjacently interior of the work-receiving opening, and gravity-actuated means disposed in the drum interior and intersecting the path of movement of the knock-out means.

7. A work-holder and work-ejecting means comprising a rotatable drum having a work-receiving opening through the peripheral body thereof, a work-holding member seated in said work-receiving opening, extended into the drum interior, having a flange mounted on the drum body, and provided with an outer open-ended work-receiving chamber, a knock-out pin movably mounted in the extended portion of said member, having an outer end portion extended into said chamber, and having an inner end portion extended into the drum interior, and a tube disposed within the drum and free to roll therein by gravity.

ERIC T. NORD.